US009053673B2

(12) United States Patent
Yuan et al.

(10) Patent No.: US 9,053,673 B2
(45) Date of Patent: Jun. 9, 2015

(54) SCALABLE INTRA-PANEL INTERFACE

(75) Inventors: Zhengyu Yuan, Cupertino, CA (US); Jian Jin, San Jose, CA (US); Ming Qu, San Jose, CA (US); Ding Lu, Sunnyvale, CA (US); Zhanpeng Zhang, Shanghai (CN); Qing Ouyang, Shanghai (CN)

(73) Assignee: Parade Technologies, Ltd., Grand Cayman (KY)

( * ) Notice: Subject to any disclaimer, the term of this patent is extended or adjusted under 35 U.S.C. 154(b) by 1071 days.

(21) Appl. No.: 13/070,416

(22) Filed: Mar. 23, 2011

(65) Prior Publication Data

US 2012/0242628 A1 Sep. 27, 2012

(51) Int. Cl.

*G06F 3/038* (2013.01)
*G09G 3/36* (2006.01)
*G09G 3/20* (2006.01)

(52) U.S. Cl.

CPC ................ *G09G 3/3611* (2013.01); *G09G 3/20* (2013.01); *G09G 2300/0426* (2013.01); *G09G 2310/027* (2013.01); *G09G 2330/06* (2013.01); *G09G 2330/12* (2013.01); *G09G 2352/00* (2013.01); *G09G 2370/08* (2013.01); *G09G 2370/14* (2013.01)

(58) Field of Classification Search

CPC . G09G 3/3611; G09G 3/20; G09G 2310/027; G09G 2330/06; G09G 2330/12; G09G 2352/00
USPC ........................................... 345/87–100, 204
See application file for complete search history.

(56) References Cited

U.S. PATENT DOCUMENTS 6,300,928 B1 * 10/2001 Kim ................................ 345/92
7,893,912 B2 * 2/2011 Kim ................................ 345/99
7,898,518 B2 * 3/2011 Hong et al. ...................... 345/99
7,936,330 B2 * 5/2011 Park et al. ....................... 345/99
7,948,465 B2 * 5/2011 Cho et al. ........................ 345/99
8,212,803 B2 * 7/2012 Hong et al. ................... 345/213
8,884,934 B2 * 11/2014 Jeon et al. ..................... 345/204
8,907,939 B2 * 12/2014 Liu et al. ....................... 345/212

(Continued)

FOREIGN PATENT DOCUMENTS

TW 200729122 A 8/2007
TW 201040911 A1 11/2010

(Continued)

OTHER PUBLICATIONS

Korean Office Action, Korean Application No. 10-2012-0065984, Oct. 22, 2013, 8 pages.

(Continued)

*Primary Examiner* — Rodney Amadiz
(74) *Attorney, Agent, or Firm* — Fenwick & West LLP

(57) ABSTRACT

A system and a method are disclosed for an intra-panel communication interface which, among other advantages, enhances system reliability and reduces bus width. A timing controller initializes communication with a plurality of source drivers by transmitting link data through a plurality of data channels and monitors source driver status through an auxiliary status channel. The plurality of source drivers share the auxiliary status channel to indicate their status. The timing controller transmits display data to a source driver through a data channel. The display data includes a request for status data from the source driver. The source driver transmits the requested status data to the timing controller via the auxiliary status channel.

24 Claims, 7 Drawing Sheets

(56) References Cited

U.S. PATENT DOCUMENTS

| | | | | |
|---|---|---|---|---|
| 8,947,412 | B2 * | 2/2015 | Jeon et al. | 345/209 |
| 2004/0221056 | A1 | 11/2004 | Kobayashi | |
| 2004/0233181 | A1 * | 11/2004 | Kobayashi | 345/204 |
| 2005/0062699 | A1 | 3/2005 | Kobayashi | |
| 2005/0062711 | A1 | 3/2005 | Kobayashi | |
| 2005/0066085 | A1 | 3/2005 | Kobayashi | |
| 2009/0244052 | A1 | 10/2009 | Takahashi | |
| 2010/0225637 | A1 * | 9/2010 | Jeon et al. | 345/213 |
| 2010/0289945 | A1 | 11/2010 | Kobayashi et al. | |
| 2011/0157103 | A1 | 6/2011 | Chen et al. | |
| 2012/0056857 | A1 * | 3/2012 | Li et al. | 345/204 |
| 2012/0056870 | A1 | 3/2012 | Koh | |

FOREIGN PATENT DOCUMENTS

| | | | |
|---|---|---|---|
| TW | 201102990 | A1 | 1/2011 |
| WO | WO 2010/131843 | A2 | 11/2010 |

OTHER PUBLICATIONS

Korean Office Action, Korean Application No. 10-2012-0065984, Jul. 24, 2014, 15 pages.

Taiwan Office Action, Taiwan Application No. 101122275, Mar. 21, 2014, 12 pages.

* cited by examiner

SCALABLE INTRA-PANEL INTERFACE

BACKGROUND

1. Field of Art

The disclosure generally relates to an intra-panel interface of a display device.

2. Description of the Related Art

A typical pixel based display includes numerous source drivers that drive a group of pixels, often a row or a column. Through multiplexing, the source drivers are able to drive any individual pixel through a unique combination of voltage source and sink. A time controller (TCON) is used to control the source drivers and display a desired image. The interface between the TCON and source drivers allows the TCON to transmit data to individual source drivers, but lacks the ability for significant communication from a source driver to the TCON. For example, to find an error in a display, the display is usually visually examined to locate unwanted visual artifacts. Source drivers are unable to report to the TCON that a transmission was not properly received from the TCON or when an error occurs during normal operation.

Many methods for communication between TCON and source drivers explicitly transmit a clock separately from data. Inclusion of this clock can cause electromagnetic interference. Additionally, existing voltage drivers used in transmitting data from a TCON to a source driver are powered by two separate rails. Such a configuration increases the size and cost of hardware needed in an intra-panel interface between TCON and source driver.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Various embodiments provide a system and method for implementing an intra-panel interface. The disclosed system and method can decrease the cost of such an intra-panel interface and enhance the level of feedback and control available to system designers. In an example embodiment, an intra-panel interface enables communication between a time controller and a plurality of source drivers. The interface provides benefits which may include reduced bus width allowing smaller board and connectors, low EMI generation, low power consumption, symbol error monitoring at source drivers and scalable high throughput. Although generally described for use in conjunction with LCD based displays, the described method is also applicable to any pixel-based display or a display with a similar configuration such as plasma based displays.

Figure 1:
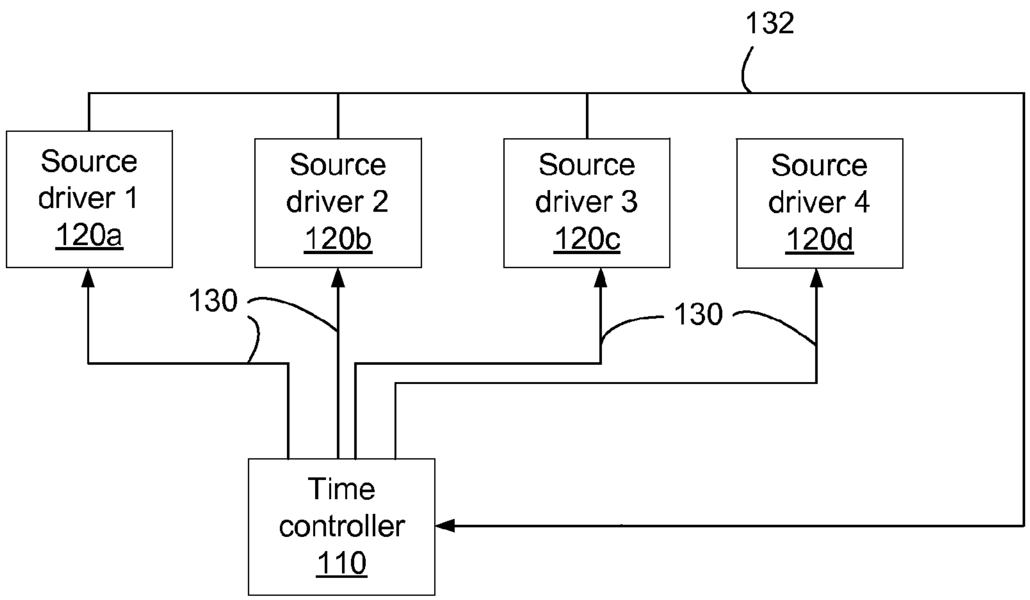
FIG. 1 is block diagram illustrating one example embodiment of an intra-panel interface between time controller and source drivers.

Referring now to FIG. 1, illustrated is a block diagram of one example embodiment of an intra-panel interface between time controller and source drivers. Similar intra-panel interface could be used on any type of panel. This intra-panel interface includes a time controller (TCON) 110, one or more source drivers 120*a*-120*d* (generally 120), one or more data channels 130 and an auxiliary status channel (ASC) 132. While only four source drivers are depicted for example purposes, many source drivers are compatible with the disclosed intra-panel interface.

The time controller 110 is communicatively coupled to each of the source drivers 120. The time controller 110 transmits data to source drivers 120 via data channels 130 and source drivers 120 transmit data to the time controller 110 via ASC 132. In one embodiment, data channels 130 are DC-coupled differential pairs with double termination. The number of data channels for communication between the TCON 110 and a source driver 120 is scalable. The number of data channels can be selected to satisfy the maximum transmission throughput used for a specific implementation. The maximum transmission throughput of a single channel is primarily limited by channel conditions between the TCON 110 and source driver 120. These conditions can include distance, quality of material and signal noise. A clock is not explicitly sent from TCON 110 to any of the source drivers 120 when communicating through data channels 130. Instead, the clock is recovered from packets by the source drivers 120 based on initialization data received from TCON 110.

The ASC 132 is a one line communication channel and enables the source drivers 120 to provide status information, for example, symbol lock status or symbol error count, to the TCON 110. The ASC is shared by multiple source drivers 120 through multi-drop configuration. This allows a reduction in area and signal line used for a plurality of source drivers 120 to communicate with the TCON 110. In one embodiment, a single ASC 132 is connected to all of the source drivers 120 in the system and the ASC 132 is connected to a single TCON 110. In another embodiment, multiple ASC 132 may be used with each ASC 132 connected to a subset of source drivers 120. In addition, multiple time controllers may be used to communicate with source drivers through data channels and multiple ASC.

The ASC 132 is used to indicate a source driver symbol lock. If not properly initialized, a source driver 120 will set ASC 132 low. Due to the multi-drop configuration, the ASC 132 will appear low unless all source drivers connected to the ASC 132 pull ASC 132 high. Therefore, TCON 110 knows that initialization has not been completed unless ASC 132 appears high. In addition, source drivers 120 can also transmit a error reports to TCON 110 over ASC 132. Error reports can include both bit error rate and symbol error reports. Source drivers 120 can transmit data over ASC 132 while continuing to receive display data from TCON 110 and properly controlling a display panel. A link symbol error report is sent in response to a request from TCON 110. The request for a link symbol error report is included in the data packets transmitted from TCON 110 to source drivers 120. A error report request from TCON 110 can only be transmitted when ASC 132 is high indicating that all coupled source drivers 120 have symbol lock. The TCON 110 can identify loss of symbol lock by observing that ASC 132 is low for at least a predetermined amount of time. This allows a source driver to transmit data to TCON 110 by controlling ASC 132, as long as ASC 132 is not left low for at least the predetermined amount of time. Source drivers contain a volatile or non-volatile memory to store the number of symbol errors that have occurred. In one embodiment, source drivers store a 16-bit symbol error counter. Source drivers 120 can check if data received from TCON 110 is valid and increment an error counter if data is invalid. Source drivers 120 can report the number of errors that have occurred to TCON 110 and reset the error counter in response to a request from TCON 110. Symbol error data and bit error count data can be recorded by individual source drivers 120. This information can later be reported to TCON 110 via ASC 132 when a request is sent from TCON 110 to a source driver 120.

TCON 110 sends a request for a symbol error report only when the ASC 132 is high. This indicates that all source drivers 120 are operating normally and able to receive and reply to transmissions. TCON 110 can send a symbol error request to only a single source driver that is connected to a shared ASC line at a time. All source drivers 120 connected to ASC 132 share the same line, and therefore, only a single source driver can fully control it at any point in time. After receiving a symbol error report from a first source driver, TCON 110 can send a request to another source driver.

The type of transmission that can be sent over ASC 132 from a source driver is limited by the fact that ASC 132 indicates that all source drivers 120 are properly initialized. In one embodiment, TCON 110 begins initialization whenever ASC is pulled low by one or more source drivers 120 for a full cycle. This allows data to be transmitted over ASC 132 as long as ASC is kept high for at least part of the cycle. To accomplish this, a coding scheme such as Manchester II is used which transitions from high to low or low to high in each cycle. Utilizing such a coding scheme, data can be transmitted without leaving ASC 132 low for a full cycle and causing initialization to begin. If a source driver does lose symbol lock or is unable to recover clock in transmissions from TCON 110, that source driver can override any transmission taking place on ASC 132 and pull the line low for a full cycle to trigger the initialization process at TCON 110.

Figure 2:
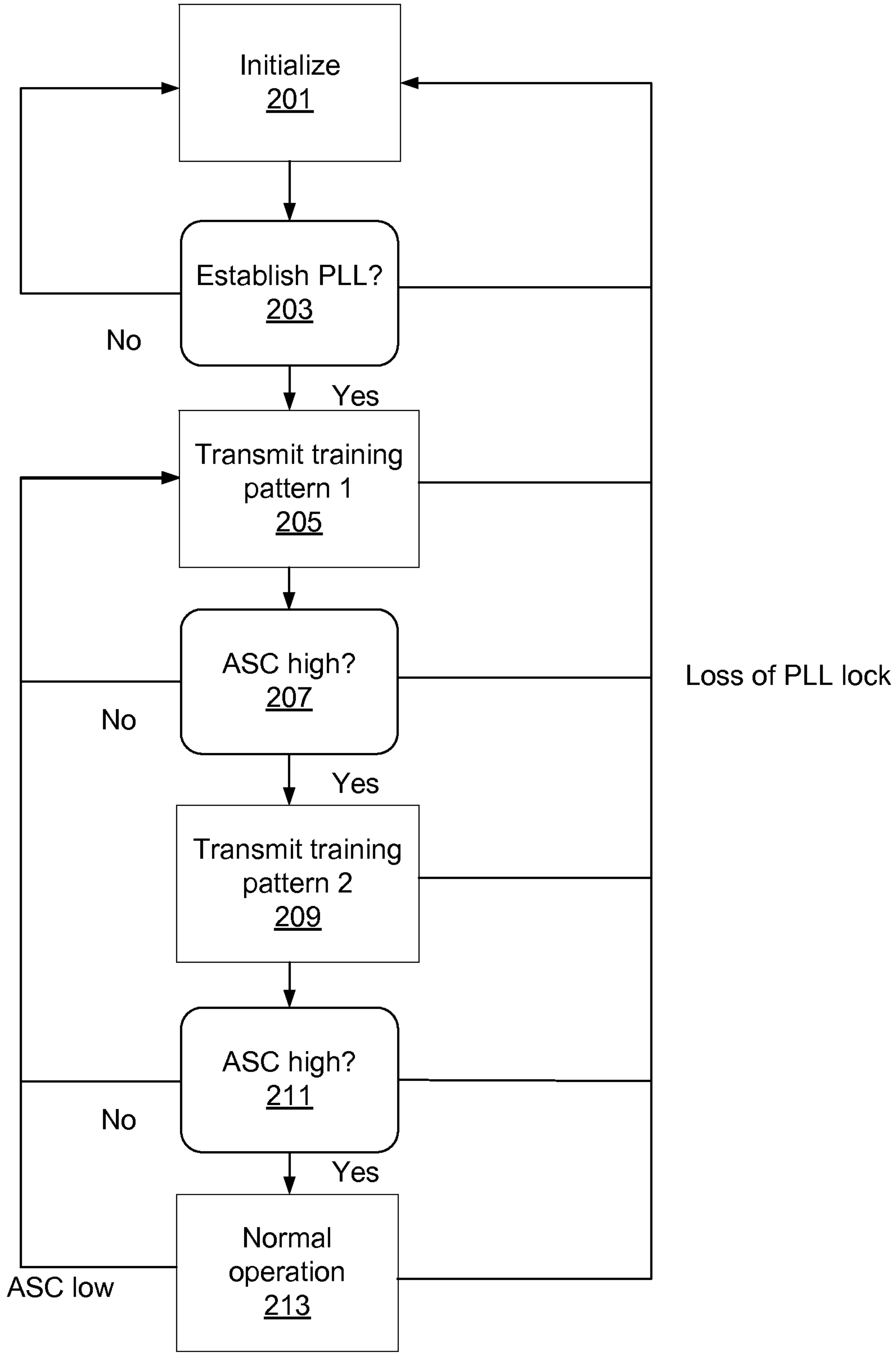
FIG. 2 is a flow chart illustrating one example embodiment of an initialization and link training transmission sequence at the TCON.

Turning next to FIG. 2, illustrated is a flow chart of one example embodiment of an initialization and link training transmission sequence at TCON 110. Initially, TCON 110 initializes 201 itself in order to be properly configured for transmission. The initialization process includes establishing a phase-locked loop (PLL). If a PLL lock is not established 203, the TCON 110 is again initialized 201 to attempt a PLL lock. If the PLL lock is established 203, the TCON 110 proceeds to link training. In link training, TCON 110 establishes a connection with the source drivers 120. In one embodiment, TCON 110 initially transmits 205 a K28.7 pattern to the source drivers 120 to enable clock recovery and symbol locking. The TCON 110 then checks if 207 the ASC is set high. A source driver 120 will set its ASC output to high if clock recovery and symbol locking have been properly established. Due to the ASC 132 configuration, the ASC 132 will be pulled low unless all coupled source drivers 120 set the ASC 132 to high. Therefore, checking that the ASC 132 is high will verify that all source drivers 120 have properly received a K28.7 pattern. If 207 the ASC is low, TCON 110 returns to step 205 and again transmits K28.7.

If 207 ASC is high, TCON 110 transmits 209 a second training pattern. In one embodiment, TCON 110 transmits ten consecutive K28.5 patterns to verify a symbol lock. TCON 110 again checks 211 that the ASC is high. If any source driver 120 detects a symbol error, the ASC will be pulled low. If ASC is pulled low, TCON returns to step 205 and again transmits training pattern 1. In another embodiment, TCON 110 may return to 209 and transmit training pattern 2. If 211 ASC is set high, TCON 110 enters 213 a normal operation state. If PLL lock is lost at any time during link training or normal operation, TCON 110 returns to the initialization step 201 and attempts to reestablish PLL lock. During normal operation, TCON 110 sends data packets to the source drivers 120 as long as ASC remains high. If ASC becomes low unexpectedly, TCON returns to step 205 to being link training once again.

Figure 3:
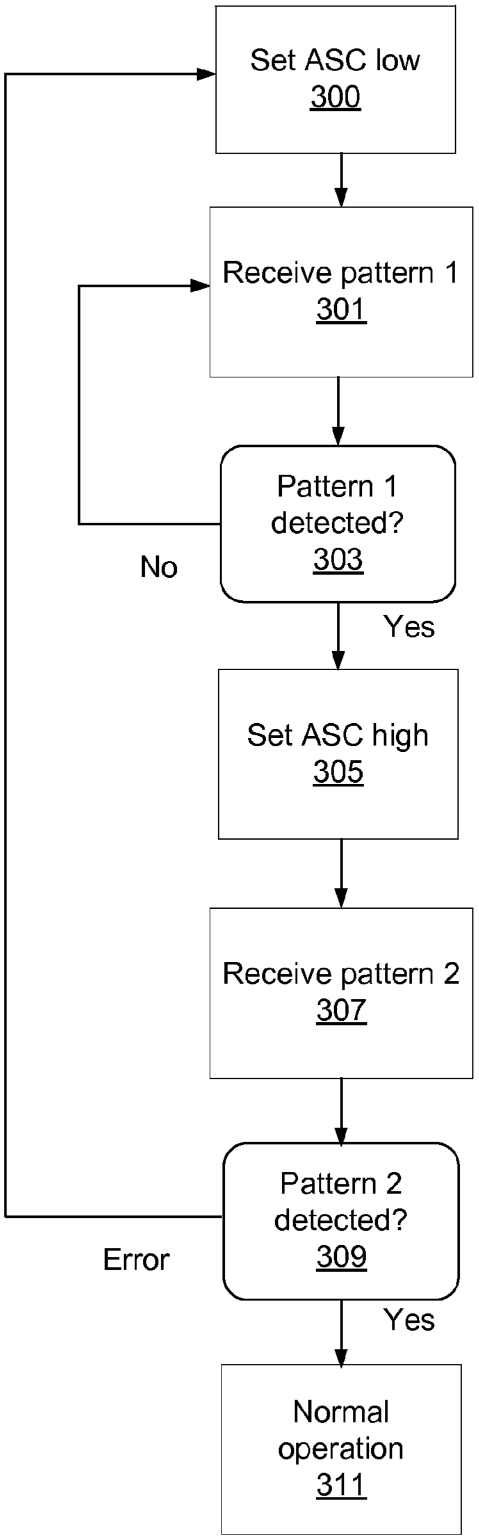
FIG. 3 is a flow chart illustrating one example embodiment of a link training transmission sequence at each of the source drivers.

Next, FIG. 3 is a flow chart illustrating one example embodiment of a link training transmission sequence at each of the source drivers 120. A source driver 120 initially sets 300 ASC low to cause link training on the TCON 110. Source driver 120 then receives 301 training pattern 1, such as a K28.7 symbol, from TCON 110 over data channel 130. If 303 training pattern 1 is detected, ASC is set 305 high to notify TCON 110 that training pattern 1 was properly received. If 303 training pattern 1 was not detected, ASC remains low and source driver 120 again attempts to receive training pattern 1. In one embodiment, five consecutive K28.7 symbols are detected before setting the ASC high.

After setting the ASC high, source driver 120 attempts to receive 307 training pattern 2, such as a K28.5 symbol. If any error is detected in receiving training pattern 2, the ASC is set low to notify TCON 110 of the error(s) and source driver 120 returns to step 300. If 309 training pattern 2 is detected and no errors occur, source driver 120 enters a state of normal operation 311. In another example embodiment, source driver 120 may receive fewer or more training patterns before entering a state of normal operation. In normal operation, the source driver decodes and acts upon display packets received from TCON 110. Display packets may include instructions related to driving a group of pixels, configuration data or requests for data from TCON 110. In one embodiment, source driver 120 sets ASC low if it is unable to perform clock recovery or the amount of symbol errors reach a certain threshold.

Figure 4:
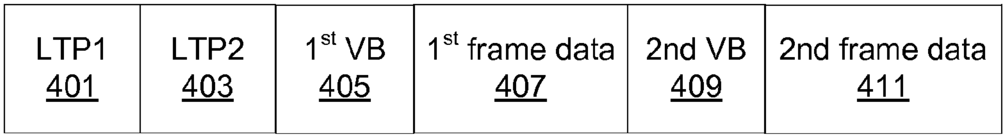
FIG. 4 illustrates one example embodiment of one or more data packets comprising information sent from TCON to a source driver.

Turning to FIG. 4, it illustrates one example embodiment of one or more data packets comprising information sent from TCON 110 to a source driver 120. While the description that follows is in the context of data communication with a source driver, e.g., 120*a*, the principles apply to the other source drivers, e.g., 120*b*-120*d*. Initially, LPT1 401 is sent to a source driver 120*a* to allow establishment of clock recovery and symbol locking. In one embodiment, this includes sending K28.7 symbols. Subsequently, LPT2 403 is transmitted to source driver 120*a* to allow source driver 120*a* to check symbol boundary. In one embodiment, LPT2 403 includes at least 10 K28.5 symbols. A vertical blanking (VB) packet 405 is then sent to source driver 120*a*. In one embodiment, VB packets are frame based and contain operation conditions for the source driver that they are sent to. VB packets can also include a request for link symbol error and/or bit error read request. Alternatively, a request for symbol error report can be included in any packet transmitted to a source driver. First ($1^{st}$) frame data 407 can then be transmitted from TCON 110 to source driver 120*a*. In one embodiment, frame data is line based and includes display data for source driver operation. A second VB packet 409 is then transmitted to source driver 120*a* from TCON 110, followed by $2^{nd}$ frame data 411. This pattern can continue sending display data to source driver 120*a* as long as all source drivers maintain symbol lock.

Figure 5A:
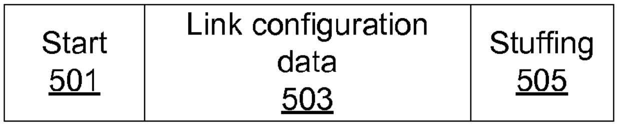
FIG. 5A illustrates one example embodiment of the structure of a VB packet transmitted from TCON to a source driver.

FIG. 5A illustrates one example embodiment of the structure of a VB packet transmitted from TCON 110 to a source driver. In one embodiment, a VB packet is transmitted to a source driver before by TCON 110 before TCON 110 transmits frame data. Initially, a start sequence 501 indicates the beginning of a packet. The start sequence can also indicate whether data scrambling is enabled. Scrambling can be used to reduce electromagnetic interference. In one embodiment, scrambling of data is performed prior to any encoding performed by TCON 110. Similarly, de-scrambling is performed at source drivers 120 after decoding data received from TCON 110. In one embodiment, scrambling is implemented using a free running linear feedback shift register. Next, link configuration data 503 is transmitted to set operation conditions. Operation conditions include a plurality of symbols setting source driver configuration. In addition, symbols are included to request a link symbol error report or bit error count request. Requests for symbol and bit error data would cause the data to be transmitted to TCON 110 over ASC 132 by the source driver 120 that received the request. These operation conditions may be repeated in whole or part to minimize loss of transmission data. Link configuration data 503 may also include 2 symbols for a checksum. Stuffing 505 can include a pseudo random binary sequence for bit error rate checking. The length and content of stuffing 505 is programmable by TCON 110.

Figure 5B:
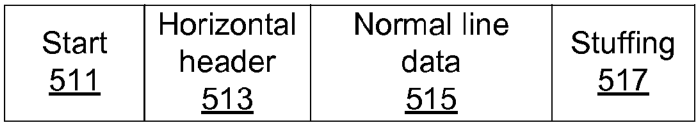
FIG. 5B illustrates one example embodiment of the structure of a line packet transmitted from TCON to a source driver.

FIG. 5B illustrates one example embodiment of the structure of a line packet transmitted from TCON 110 to a source driver. A plurality of such data packets is used to transmit frame data described in FIG. 4. For example, $1^{st}$ frame data 407 and $2^{nd}$ frame data 411 are typically comprised of multiple packets each. Initially, a start sequence 511 indicates the beginning of a packet. The start sequence also can indicate whether data scrambling is enabled or disabled. Next, a horizontal header 513 is transmitted to set line based configuration data. The horizontal header 513 typically varies with different panels. In one embodiment, the horizontal header indicates if a VB packet should be used. Following the horizontal header 513, normal line data 515 or display data is transmitted. Normal line data 515 includes line pixel data that has be scrambled and/or encoded. Finally, stuffing 517 is transmitted from TCON 110 to source drivers 120. Stuffing 517 can include a pseudo random binary sequence for bit error rate checking and the duration of the stuffing period is set by the TCON 110.

Clock and data recovery is performed at each of the source drivers 120 to interpret transmissions from TCON 110. In one embodiment, an 8b/10b encoding scheme is utilized to transfer data from TCON 110 to source drivers 120. Upon receiving data, the data may be re-arranged by the source drivers 120 to decode the proper data for a specific color component to be displayed.

Figure 6:
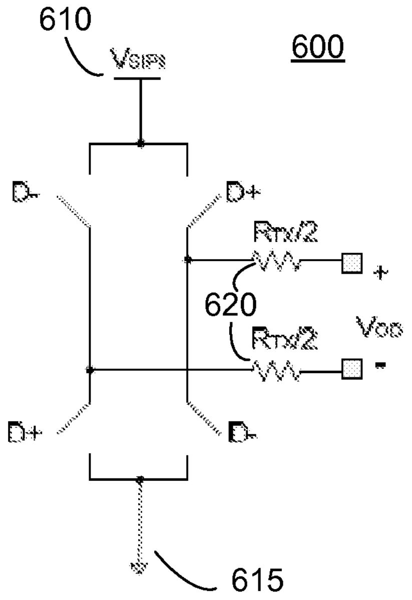
FIG. 6 illustrates one example embodiment of a voltage mode driver used by a TCON to transmit data to the source drivers.

Referring now to FIG. 6, it illustrates one example embodiment of a voltage mode driver 600 used by TCON 110 to transmit data to the source drivers 120. The voltage mode driver 600 uses a ground referenced DC coupled voltage scheme. Rather than two separate rails providing voltage levels, a single supply voltage 610, along with ground voltage 615, is provided to the voltage mode driver 600. To limit the voltage swing that occurs with this configuration, termination resistors 620 are included. In a chip-on-film application, these termination resistors 620 are matched with the characteristic impedance of the channel between TCON 110 and a source driver, e.g., 120*a*. By using a single supply voltage 610 and terminations resistors 620, the size and cost of hardware used in transmission from the TCON 110 can be reduced. Low supply voltage operation is also enabled by using ground referenced DC coupling at the voltage mode driver 600.

Figure 7:
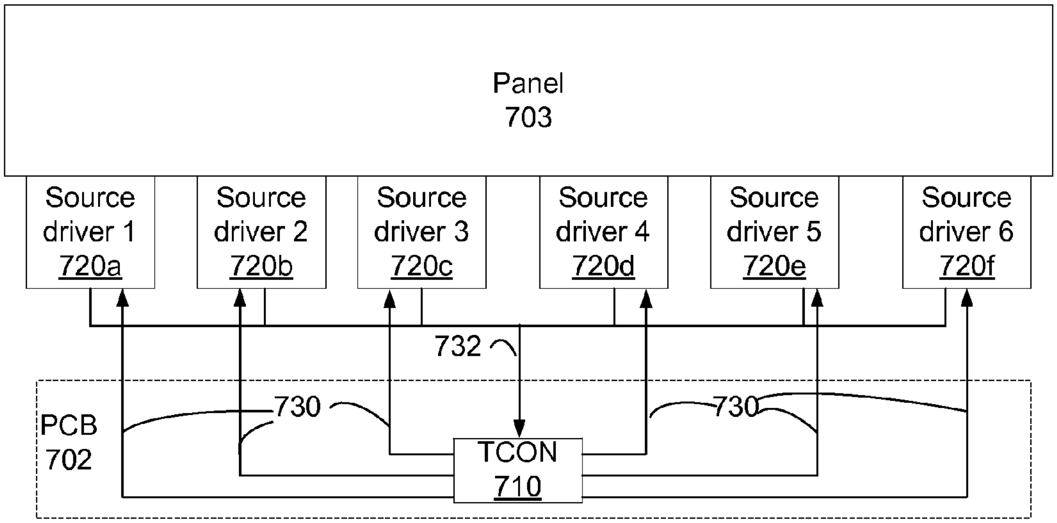
FIG. 7 illustrates one example embodiment of a chip-on-film (COF) interface implementation of the disclosed intra-panel interface.

Next, FIG. 7 illustrates a chip-on-film (COF) interface implementation of the intra-panel interface disclosed above. The configuration includes a printed circuit board (PCB) 702, panel 703, TCON 710, one or more source drivers 720*a*-720*f* (generally 720), data channels 730 and ASC 732. It is noted that the TCON 710 is functionally similar to the TCON 110 and the source drivers 720 are functionally similar to the source drivers 120. TCON 710 is communicatively coupled to each of the source drivers 720. TCON 710 transmits data to source drivers 720 via data channels 730 and source drivers 720 transmit data to TCON 710 via ASC 732. In one embodiment, data channels 730 are DC-coupled differential pairs with double termination. The number of data channels for communication between TCON 710 and a source driver 720 is scalable. A PCB 702 contains components used in operation of a display panel and helps display an image on the panel 703. In one embodiment, panel 703 contains the surface on which an image is displayed. TCON 710 is operable to provide display data to source drivers 720. Additionally, TCON 710 can receive symbol lock status and error reports from source drivers 720. Display data is transmitted from TCON 710 to source drivers 720 using data channels 730. While a single wire is illustrated, in one embodiment the data channels 730 are DC-coupled low-voltage differential pairs with double termination. Multiple source drivers transmit data to TCON by sharing the same ASC 732 as described above. In one embodiment, the source drivers 720 are placed between and in contact with both the PCB 702 and panel 703.

Figure 8:
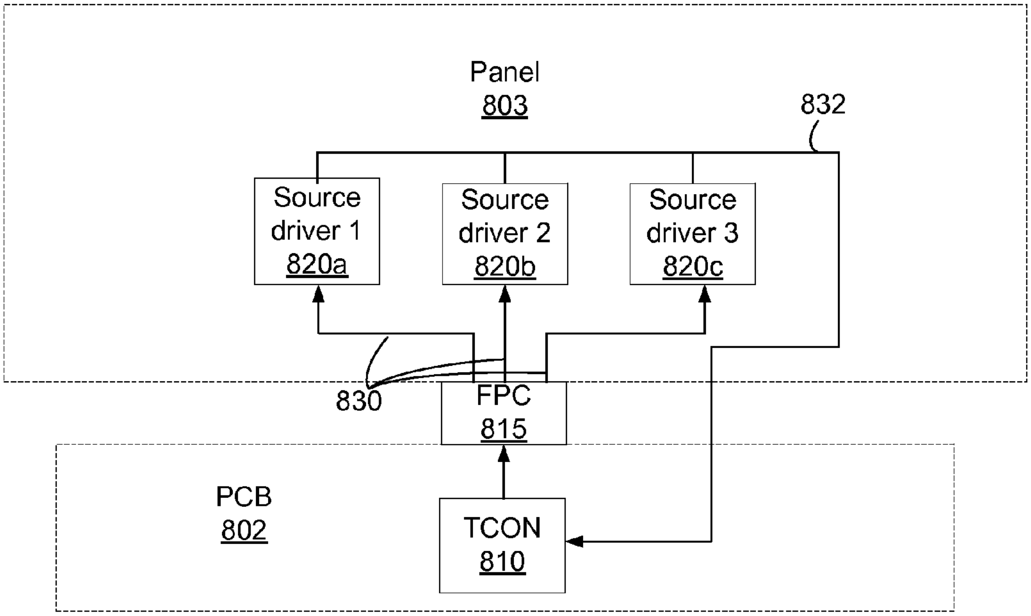
FIG. 8 illustrates one example embodiment of a chip-on-glass (COG) interface implementation of disclosed the intra-panel interface.

FIG. 8 illustrates a chip-on-glass (COG) interface implementation of the intra-panel interface disclosed above. FIG. 8 includes a printed circuit board (PCB) 802, panel 803, TCON 810, flexible printed circuit (FPC) 815, one or more source drivers 820*a*-820*c* (generally 820), data channels 830 and ASC 832. It is noted that the TCON 810 is functionally similar to the TCON 110 and the source drivers 820 are functionally similar to the source drivers 120. TCON 810 is communicatively coupled to each of the source drivers 820 through FPC 815. TCON 810 transmits data to source drivers 830 via data channels 830 and source drivers 820 transmit data to TCON 810 via ASC 832. In one embodiment, data channels 830 are DC-coupled differential pairs with double termination. The number of data channels for communication between TCON 810 and a source driver 820 is scalable. A PCB 802 contains components used in operation of an LCD panel and helps display an image as part of the panel 803. TCON 810 is operable to provide display data to source drivers 820. Additionally, TCON 810 can receive symbol lock status and error reports from source drivers 820. Display data is transmitted from TCON 810 to source drivers 820 using data channels 830. FPC 815 serves as an intermediary transporting display data received from TCON 810 to source drivers 820. Multiple channels can be used to carry all data channel information from TCON 810 to FPC 815. While a single wire is illustrated, in one embodiment the data channels 830 are DC-coupled low-voltage differential pairs with double termination. Multiple source drivers transmit data to TCON 810 by sharing the same ASC 832 as described above.

In one embodiment, FPC 815 is placed between and in contact with both the PCB 802 and panel 803. Multiple FPC can be used to transmit data to a plurality of source drivers. In one embodiment, each FPC transmits data from a TCON to a subset of source drivers. In addition, subsets of source drivers may all use the same ASC 832 or subsets can be assigned separate ASC lines. FIGS. 7 and 8 are not meant to limit the possible implementations of the disclosed intra-panel interface, but provide examples of configurations that may be used. Any system including a TCON and source driver or similar components can make use of the disclosed intra-panel interface.

The system and method described above enable enhanced reliability in an intra-panel communication interface, such as the interface between a TCON and source drivers. The TCON is able to receive accurate and up to date error information from the source drivers and take action to minimize the number of errors occurring. By using a single ASC line to transmit information from a plurality of source drivers, the area needed for and cost of connectors are reduced. Additionally, the intra-panel interface features scalability allowing integration with high resolution displays by increasing number of data channels between the TCON and source driver.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The phrase "in one embodiment" in various places in the specification is not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and method for enabling enhanced reliability in an intra-panel communication interface through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for intra-panel communication, the method comprising:

receiving display data at a source driver in a packet based transmission, the display data including a request for status data;

recovering clock information from the received display data;

setting a status output signal of the source driver to a high state responsive to recovering the clock information; and transmitting, when the status output signal of the source drive is at a high state, requested status data from the source driver via an auxiliary status channel while continuing to receive display data via a data channel, the auxiliary status channel shared by a plurality of source drivers.

2. The method of claim 1, wherein the status data indicates a number of symbol errors detected by the source driver, which occurred on the data channel since a previous request for status data.

3. The method of claim 2, wherein the status data is transmitted during continued operation of the source driver.

4. The method of claim 1, wherein the status data indicates symbol lock status and link symbol error information.

5. The method of claim 1, wherein the display data is transmitted using 8b/10b encoding.

6. The method of claim 1, wherein the status data is transmitted using a coding scheme that generates coded data that transitions at least once per clock cycle, the clock cycle based on the recovered clock information.

7. The method of claim 1, further comprising:

receiving link training data at the source driver, the link training data enabling the source driver to recover clock information from the display data.

8. The method of claim 1, wherein the display data includes repeated requests for status data.

9. A system for intra-panel communication, the system comprising:

a time controller configured to transmit packet based display data, the display data including a request for status data;

an auxiliary status channel communicatively coupled to the time controller and a plurality of source drivers; and a source driver, of the plurality of source drivers, configured to receive the display data, via a data channel, and recover clock information from the display data, the source driver further configured to respond to the request for status data by sending status data via the auxiliary status channel to the time controller while receiving display data via the data channel.

10. The system of claim 9, wherein the status data indicates a number of symbol errors detected by the source driver, which occurred on the data channel since a previous request for status data.

11. The system of claim 9, wherein the status data is transmitted during continued operation of the source driver.

12. The system of claim 11, wherein the status data indicates symbol lock status and link symbol error information.

13. The system of claim 9, wherein the display data is transmitted using 8b/10b encoding.

14. The system of claim 9, wherein the status data is transmitted using a coding scheme that generates coded data that transitions at least once per clock cycle, the clock cycle based on the recovered clock information.

15. The system of claim 9, wherein the time controller is further configured to transmit link training data to the source driver, the link training data enabling the source driver to recover clock information from the display data.

16. A computer program product for intra-panel communication, the computer program product comprising a non-transitory computer-readable storage medium storing instructions that when executed cause at least one processor to:

receive display data at a source driver in a packet based transmission, the display data including a request for status data;

recover clock information from the received display data;

set a status output signal of the source driver to a high state responsive to recovering the clock information; and transmit, when the status output signal of the source drive is at a high state, requested status data from the source driver via an auxiliary status channel while continuing to receive display data via a data channel, the auxiliary status channel shared by a plurality of source drivers.

17. The computer program product of claim 16, wherein the status data indicates a number of symbol errors detected by the source driver, which occurred on the data channel since a previous request for status data.

18. The computer program product of claim 16, wherein the status data is transmitted during continued operation of the source driver.

19. The computer program product of claim 18, wherein symbol lock status indicates whether the source driver can recover clock information from the display data.

20. The computer program product of claim 16, wherein the status data is transmitted using a coding scheme that generates coded data that transitions at least once per clock cycle, the clock cycle based on the recovered clock information.

21. The computer program product of claim 16, further comprising instructions that when executed cause the at least one processor to:

receive link training data at the source driver, the link training data enabling the source driver to recover clock information from the display data.

22. The computer program product of claim 16, wherein the display data includes repeated requests for status data.

23. A system for intra-panel communication, the system comprising:

a time controller configured to transmit packet based display data, the display data including a request for status data, the time controller transmitting display data using a ground referenced DC coupled voltage driver, wherein a single supply voltage level and a single ground voltage level are supplied to the driver; and a source driver configured to receive the display data, via a data channel, and recover clock information from the display data, the source driver further configured to respond to the request for status data by sending status data to the time controller, via an auxiliary status channel.

24. The method of claim 23, wherein the request for status data is included in a packet transmitted by the time controller via the data channel.

* * * * *